O. NAGEL.
PROCESS OF RECOVERING METALS FROM NATURAL WATERS.
APPLICATION FILED NOV. 11, 1916.
1,358,096.
Patented Nov. 9, 1920.
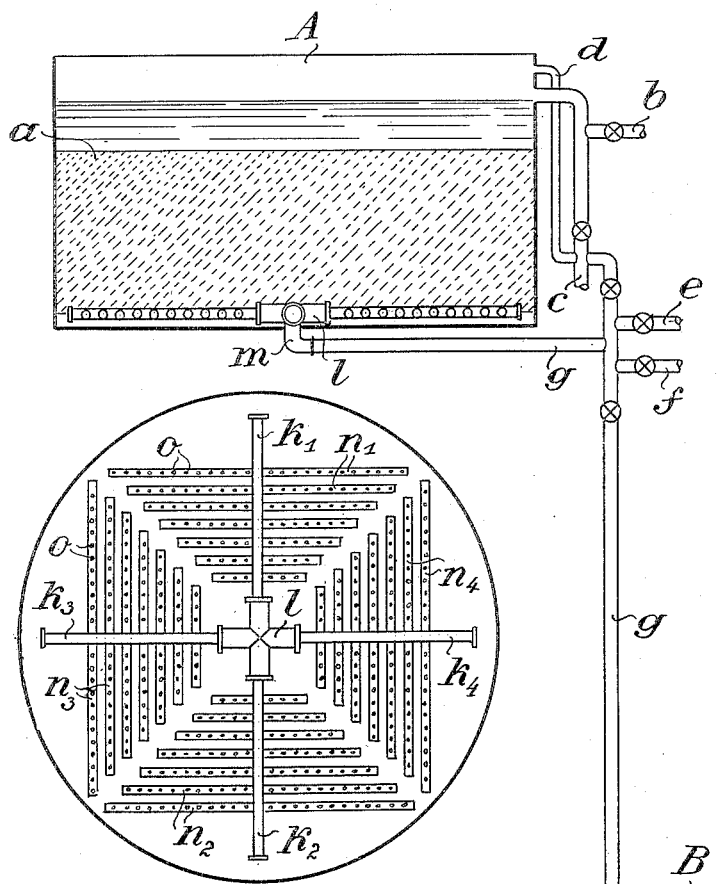
Fig.1
Fig.2
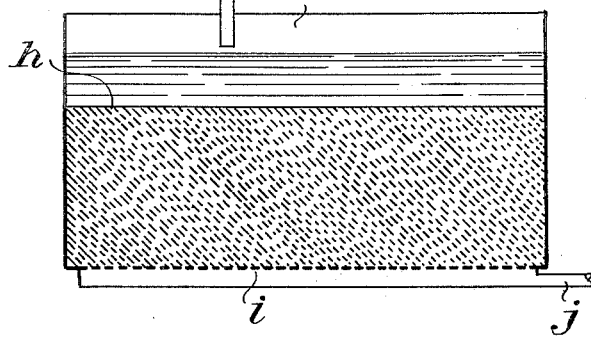
Witnesses
Inventor
Oskar Nagel
By Dyer Taylor
Attorneys.

UNITED STATES PATENT OFFICE.

OSKAR NAGEL, OF VIENNA, AUSTRIA, ASSIGNOR, BY MESNE ASSIGNMENTS, TO THE CHEMICAL FOUNDATION, INC., A CORPORATION OF DELAWARE.

PROCESS OF RECOVERING METALS FROM NATURAL WATERS.

1,358,096.      Specification of Letters Patent.      Patented Nov. 9, 1920.

Application filed November 11, 1916. Serial No. 130,760.

*To all whom it may concern:*

Be it known that I, Dr. OSKAR NAGEL, a citizen of the United States of America, residing at Vienna, Austria, have invented certain new and useful Improvements in Processes of Recovering Metals from Natural Waters, of which the following is a specification.

My invention relates to the recovery of precious, rare and other metals from natural solutions, such as sea water, spring water, river water, etc. The main object of my invention is the production, in quantities and in an economical manner, of metals from extremely dilute solutions, as for instance gold, silver, etc., from sea water, radium from spring water, etc.

I am aware, that for thirty or forty years it has been known, that sea water contains gold in minute traces and several suggestions have been made to recover such gold and other precious metals. A method or process, however, for accomplishing this result in an economical, industrial, reliable manner was not known or practised, nor was the reason known, why with all the former processes it was impossible to obtain a commercial success. I have discovered a method, whereby metals can be recovered from extremely dilute solutions economically, by ordinary technical and engineering appliances. I have devised a process, whereby this discovery is made available beyond mere laboratory work and whereby the recovery of metals from extremely dilute solutions may be carried on on a commercial scale, in an economic, safe and certain manner.

It is a well established fact, that metals, such as gold, silver, the metals of the platinum group, thorium, vanadium, zirconium, etc., are precipitated even from extremely dilute solutions (such as for instance a solution of 1 part of gold in 300,000,000 parts of water) by means of certain substances, called "adsorbents." The precipitation takes place, no matter whether the metal is present as salt or ionized or in the colloidal state. The adsorbents that may be most conveniently used for such precipitation are fullers' earth, fibrous materials, wood, saw dust, granulated blast furnace slag (that has been coated with ferric hydroxid by impregnation with ferrous sulfate and subsequent oxidation), pumice stone coated with ferric hydroxid or hydroxid of aluminum, crushed bricks, infusorial earth, coal, coke, charcoal, peat, etc.

The most convenient way of precipitating the metals on the surface and in the pores of the adsorbent is obviously the filtration of the solution through a filtering layer or filter bed of the adsorbent material. If an extremely dilute solution of a metallic salt in distilled water is filtered through an adsorbent filter of sufficient thickness, the metal is, in fact, retained by the adsorbent, so that, depending upon the nature of the adsorbent, a more or less concentrated product, an "artificial" ore is obtained. By transferring this method from solutions in distilled water to natural solutions such as sea water, etc., however, no satisfactory result is obtained, because of the fact, that the adsorbent filter will soon become inefficient due to clogging, so that a filtration may not be continued for the sufficient length of time and consequently the sufficient accumulation of metal upon the adsorbent is impossible,—a proof, that by simple filtration economical and commercial results cannot be obtained. It is not possible to obtain good results by digesting the adsorbent with sea water. A series of experiments which I have performed with sea water has shown, that the efficiency of all adsorbents, when sea water is filtered, rapidly decreases and a like decrease of efficiency was observed by me with other natural waters.

In continuing my experiments for the purpose of arriving at a satisfactory explanation of this fact, I found that sea water containing five milligrams of gold per cubic meter did not yield the gold as easily nor as rapidly, as a solution of the same percentage of gold (in form of chlorid or sodium-aurichlorid) in distilled water. I could also, as above intimated, observe a rapid decrease of the efficiency of the adsorbent and of the velocity of filtration and found that, after a comparatively short time, the flow of sea water stopped entirely. The quantity of metal deposited from the sea water was much less than the quantity deposited from the solution in distilled water in the same length of time and, further, the accumulation of gold from sea water ceased far below the lowest economical limit, while with the solution in distilled water the process could be continued, yielding a product of commercial value.

An investigation of the adsorbent filter mass, through which the sea water had passed, gave the explanation of the decrease of efficiency, of the decreased velocity of filtration and also of the final clogging up of the filter. Every grain of the adsorbent was found to be coated with a thin, gelatinous skin, consisting of oceanic micro-organisms. The skin makes the adsorbent inefficient, while a further accumulation of micro-organisms entirely stops the filtration.

Based upon these results, I devised a method for obviating the above mentioned difficulty. The work was performed on a large scale: I installed two filters, one above the other, using sand as the filtering material in the upper and an adsorbent in the lower filter. In order to secure a satisfactory result and to be able to continue the filtration until sufficient metal was accumulated in the adsorbent a manifold system of piping was provided in the bottom of each filter. Through this system the stream of water was reversed from time to time, in order to keep the adsorbent filter as also the sand filter in a clean and active condition. The result obtained by means of this "backwashing" device was perfectly satisfactory. The sea water first passing through the sand filter and depositing there all suspended matter, finally passed through the adsorbent filter and deposited its metallic content to such an extent and at such a rate, that the accumulation of metal on the adsorbent represented a very rich, high-grade "artificial" ore, from which the metals were recovered by well known methods. From time to time, whenever the velocity of filtration began to decrease, the stream of water was reversed in the upper filter in order to keep it in full activity, while such reversal of the stream was found unnecessary in the filter containing the adsorbent, so that the "washing" system of pipes was removed from the latter. By such "prefiltration" and removal of the micro-organisms and other suspended matter I succeeded in continuing the operation until the desired effect and sufficient accumulation was obtained.

Further experiments on a large scale showed, that the use of two filters, as described above, is not absolutely essential if the quantity of micro-organisms and other suspended matter contained in the waters is but moderate, since even with one filter (containing the adsorbent) satisfactory results are obtained if this filter is provided with a washing system of pipes for the reversal of the water stream and if, further, the reverse operation for washing the filter bed is carried out for one or two minutes, whenever the rapidity of the downward filtration decreases. This method permits the recovery of metals not only from sea water, but just as well from any natural water. By prefiltering the water to be used or by treating it in filters, in which the adsorbent may be cleaned satisfactorily, i. e. in filters that permit the filtering of very large volumes of water, the recovery of metals from extremely dilute solutions becomes a commercial success. Prior failures to obtain a technical and economic efficiency can now easily be understood, from the fact that all former experimenters tried to use plain sea water and plain filters, while no one, prior to myself, has ever suggested or attempted to use prefiltered water or "washing" filters.

In carrying out my invention I first remove from the sea water or other natural water the micro-organisms and other suspended matter by filtration through sand or the like. For this filtration I prefer to use filter tanks, such as are used in most of the modern water works, consisting of certain units constructed of wood, steel, concrete or masonry, circular or rectangular in form. Within these filter tanks superimposed upon a manifold system of piping, are the sand beds. When, after some time of filtration, the velocity of flow of the filtered water decreases, it is necessary to discontinue the downward filtration for a few minutes, in order to clean or wash the filtering material. During this process of washing the filter, a reverse stream of water is forced, under pressure, upward through the filtering material to flush off the impurities collected during the time the filter was in operation. It is advantageous, in order to prevent the formation of channels in the filter bed, to assist this reverse stream with mechanical force, i. e. either by means of mechanical agitators or rakes or by compressed air. When the wash water runs off clean and clear the washing process is stopped and the downward filtration continued.

The water so purified from micro-organisms and other suspended matter is allowed to travel through an ordinary filter containing the adsorbent material. If the prefiltration has been carried out according to the above description, no clogging takes place and the travel of the solution through the adsorbent can be continued without any difficulty and without any decrease of efficiency of the adsorbent, until a sufficient quantity of metal is accumulated in the form of an "artificial" ore to warrant the recovery and refining of the metal by the ordinary metallurgical operations.

If the water to be used does not contain a very large amount of suspended matter, the prefiltration through sand may be omitted, and the entire operation may be carried out in one filter containing the adsorbent and being provided with a device for washing the adsorbent material by reversing the stream of water. If the process is to be carried out in one operation, without prefiltration, it is necessary to discontinue the downward travel of the solution for a few minutes, whenever the velocity of flow decreases and to force a reverse stream of water or solution through the adsorbent for one or two minutes. After washing, the downward travel is continued until again the washing operation becomes necessary. This method may also be combined with prefiltration in such a manner, that the main bulk of the impurities is retained by a sand filter, while a small quantity of suspended matter passing to the adsorbent filter, is removed from the latter by "reverse stream".

It is of course immaterial whether gravity filters or pressure filters are used for carrying out my process.

I will describe my process more particularly in connection with the accompanying diagrammatic drawings, in which Figure 1 is a side view of the apparatus and Fig. 2 a top view of the bottom of the filter.

In Fig. 1 the water to be utilized is pumped to the upper tank A, in which $a$ represents the filter sand, $b$ the water inlet, $c$ the connection to sewer, $d$ the overflow, $e$ the pipe for compressed air, $f$ the pipe for washwater, $g$ the outlet. Whenever the velocity of filtration decreases the current of water is reversed (through $f$) and simultaneously air is blown through $e$. The filtered water passes to the lower tank B which contains the adsorbent filter bed $h$, resting on a perforated bottom $i$. The "exhaust water" passes through $j$ to the sewer.

In Fig. 2 which shows the manifold system of pipes, $k_1$, $k_2$, $k_3$, and $k_4$ are pipes connected by a cross $l$ in the center of the tank. From the said cross a socket $m$ (Fig. 1) connects downward to the outlet $g$ and wash water pipe $f$, respectively. Branching from the pipes $k_1$, $k_2$, $k_3$, $k_4$ systems of parallel pipes $n_1$, $n_2$, $n_3$, $n_4$ are provided which contain suitable openings $o$ to permit a uniform distribution of the waters.

If the prefiltration through sand is omitted, the process is carried out by means of a single filter having a bed consisting of an adsorbent material, e. g. charcoal and constructed in the same manner as shown in the upper part of the drawing, that is to say, so as to enable the reversal of the stream of water from time to time.

What I claim is:

1. The process of recovering metals from natural waters, which comprises removing suspended matter contained in the waters, and then passing the waters through an adsorbent.

2. The process of recovering metals from natural waters, which comprises filtering the waters, and then passing the filtered water through an adsorbent material.

3. The process of recovering metals from natural waters, which comprises passing the waters through an adsorbent, and then reversing the direction of the water through the adsorbent.

4. The process of recovering metals from natural waters, which comprises passing the water through a filter, then passing the filtered water through an adsorbent, and then reversing the direction of the water through the adsorbent.

Dr. OSKAR NAGEL.

Witnesses:
August Fugger,
Johann Fleischmann.